March 19, 1968  J. L. BEILMAN  3,373,605

AIR SPEED INDICATING APPARATUS

Filed Feb. 21, 1966  2 Sheets-Sheet 1

JOHN L. BEILMAN
*INVENTOR.*

BY *Allen J. Jaffe*

AGENT

JOHN L. BEILMAN
INVENTOR.

United States Patent Office 3,373,605
Patented Mar. 19, 1968

3,373,605
AIR SPEED INDICATING APPARATUS
John L. Beilman, Lancaster, N.Y., assignor to Cornell Aeronautical Laboratory, Inc., Buffalo, N.Y., a corporation of New York
Filed Feb. 21, 1966, Ser. No. 529,001
5 Claims. (Cl. 73—182)

ABSTRACT OF THE DISCLOSURE

A true air speed indicating instrument having two rotating arms driven by a constant speed motor, velocity sensors on the tips of the arms and air foils having opposite angles of incidence mounted severally on each of the arms.

---

The present invention relates to air speed indicators, and more particularly to air speed indicators that are sensitive to very low air speeds.

Air speed indicators are known which are designed to measure the low air speeds encountered in helicopter flights. These indicators comprise one or more rotating pitot tubes, wherein the amplitude of the cyclic variations in pressure sensed by the tube or tubes, as they move into the direction of flight and away therefrom is directly proportional to the forward velocity or air speed of the aircraft. To develop higher pressure differentials for greater sensitivity, these types of indicators utilize independent motor means to rotate the tube or tubes. In this manner, the pressures sensed by the tubes are much higher than those that would be developed only by the low air speed.

Attempts to record or measure air speeds lower than approximately five knots have not been successful with prior devices. Thus, with these prior devices there exists a minimum threshold value of sensitivity.

This inability to measure air speeds below a minimum threshold value is thought to be due to a radial flow or whirl that is generated by the instrument itself. The prior instrument basically comprises a rotating arm having a pitot tube at the end thereof. The rotating arm generates a flow from above and below the arm center and radially outward along the length of the arm, much like the action of a centrifugal pump. At very low air speeds, this flow enveloping the pitot tube prevents the tube from sensing the pressures which are generated by the forward speed of the aircraft. At higher speeds this induced flow has not interfered with operation or the instrument or measurement of velocity.

It is therefore a primary object of the present invention to provide an improved rotating tube air speed indicator that is sensitive to extremely low air speeds; namely, those below the threshold values of prior instruments.

It is a more specific object of the present invention to provide a rotating tube air speed indicator with means to eliminate the self-generated flow in the plane of air speed measurement.

Another object of the present invention is to provide an air speed indicator which is adapted to measure the low air speeds encountered by helicopters as well as others VTOL (vertical takeoff and landing) aircraft.

Another object of the present invention is to provide an indicator which can accurately measure extremely low wind velocities.

Still other objects and advantages of the present invention will become apparent from a reading of the following detailed description of the same taken in conjunction with the accompanying drawings wherein.

Figure 1:
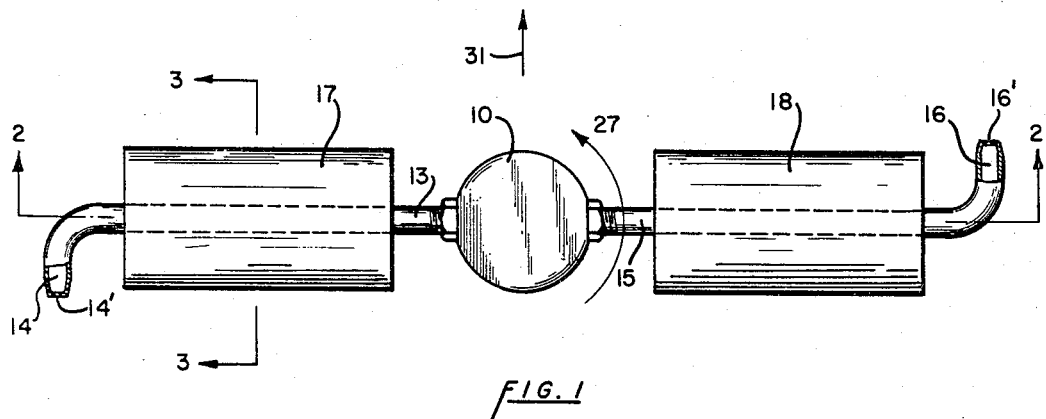
FIGURE 1 is a top plan schematic view of an air speed sensing instrument of apparatus embodying the present invention.

Referring now to the drawings, the air speed sensing instrument comprises a central hub portioin 10 in the shape of a disc having elbow-shaped passages 11 and 12 suitably drilled therein. Communicating with the horizontal portion of passage 11 and suitably attached to hub 10 is one end of an elongated straight tubular arm 13 arranged horizontally and having at its other end and disposed at right angles thereto a horizontal velocity head sensing pilot tube 14 having a total pressure orifice 14′ in the outer end thereof. It is clear that pitot tube 14 could be separate and suitably connected to arm 13 if desired.

Communicating with passage 12 and suitably attached to hub 10 is a second elongated straight tubular arm 15 which is also horizontally arranged but 180° disposed with respect to arm 13. The arms 13 and 15 are rigidly mounted to hub 10 so that no relative movement therebetween is possible. At the outer end of arm 15 is a second pitot tube 16 having a total pressure orifice 16′ therein, which is oriented 180° from total pressure orifice 14′ of pitot tube 14.

Figure 3:
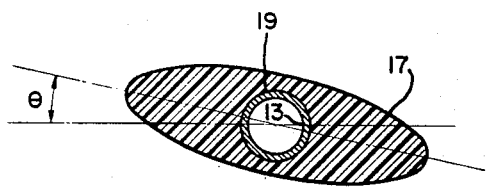
FIGURE 3 is a transverse sectional view thereof taken along line 3—3 of FIGURE 1.

Fixedly mounted, for constraint to movement about a vertical axis only, on arms 13 and 15, as by cement, and extending lengthwise thereof and intermediate the ends thereof are a pair of air foils 17 and 18 severally having a longitudinal opening 19 therethrough for the reception of the corresponding arm 13 or 15. The air foils can be made of any suitable material, as for example, a molded plastic. As shown in FIGURE 3, the air foil 17 is pitched at an angle $\theta$ with respect to the horizontal and typically this angle $\theta$ may be about 5°. The other air foil 18 is pitched at a similar angle but reversed with respect to air foil 17 in the manner of a propeller. It is immaterial to the invention whether air foils 17 and 18 upon rotation about a vertical axis move a column of air upwardly or downwardly.

Figure 2:
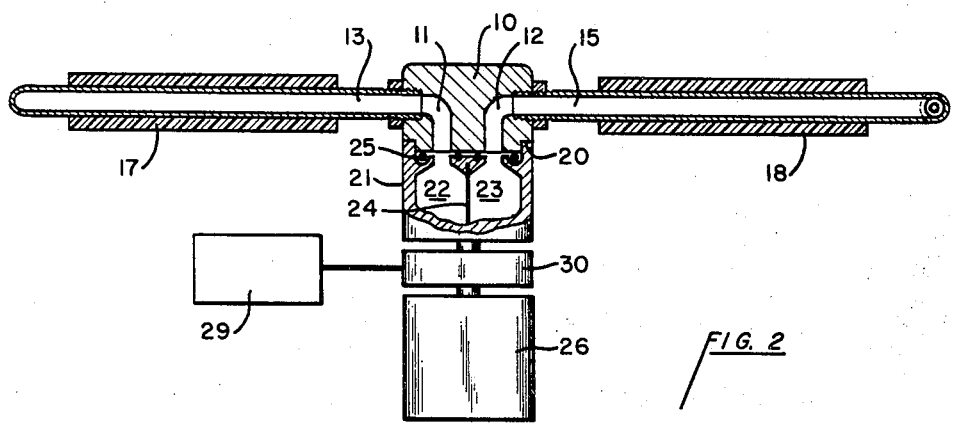
FIGURE 2 is a partial vertical longitudinal sectional view thereof taken along line 2—2 of FIGURE 1, including some elements not shown in FIGURE 1.

Suitably attached to the lower end 20 of hub 10 is a transducer unit 21. The input portion of this unit is shown in cutaway in FIGURE 2 and comprises a pair of chambers 22 and 23 separated by a differential pressure sensing diaphragm 24. Chambers 22 and 23 communicate respectively with the lower vertical ends of passages 11 and 12 and are sealed with respect to each other and the exterior of unit 20 by means of a plurality of O-rings 25. Existence of a different pressure in chambers 22 and 23 will cause diaphragm 24 to flex or bend in proportion to the extent of the differential pressure.

Mounted in unit 21 may be any suitable transducer for converting the movement of diaphragm 24 into an electrical signal as, for example, a variable reluctance type pickoff or, simply, a strain gage unit.

Provided below hub 10 and transducer unit 21 is a motor unit 26 for rotating about a vertical axis unit 21, hub 10 and arms 13, 15 at a substantially constant speed in the direction of arrow 27 in FIGURE 1. The electrical signal output of transducer unit 21 is conveyed to the electronic portion of the apparatus shown in block form at 29 by means of a slip ring and brush assembly 30 as is well known to those skilled in the art.

Referring to FIGURE 1, the arrow 31 represents the horizontal direction of the wind relative to the craft on which the inventive air speed indicating apparatus is mounted.

The pressure difference that is sensed by diaphragm 24 is given by the formula:

$$\Delta P = 2\rho V V_s \sin \omega t$$

where $\rho$ is the air density,
$V$ is the relative velocity or air speed,
$V_s$ is the linear velocity at the arm tips due to the constant rotational speed, $\omega$, there of, and,
$\omega t$ is the angle that arms make with the direction of the relative wind.

Figure 4:
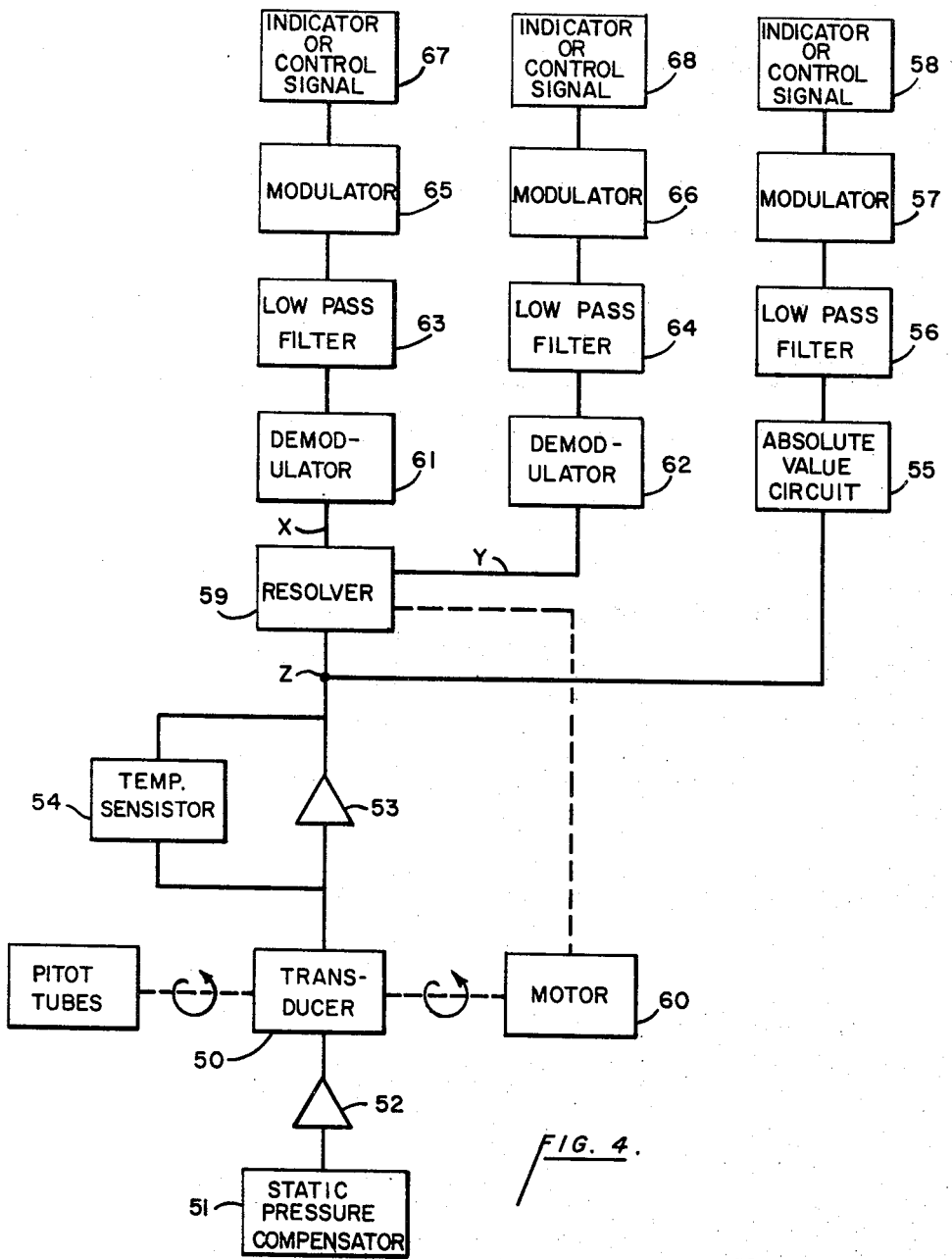
FIGURE 4 is a block diagram of the entire indicating apparatus.

Neglecting for the moment, density changes, it can be seen that the sensed pressure difference between pitot tubes 14 and 16 is a direct function of V, the relative air speed. To compensate for air density variations, the transducer represented at 50 in FIGURE 4 is excited by a voltage that is adjusted to compensate for static pressure variations by means of a static pressure compensator 51 which could be a 15 p.s.i. pressure transducer, this voltage being suitably amplified at 52. Since density is a function of temperature as well as pressure, the output of transducer 50 must be also adjusted for temperature variations. This can be achieved by suitably varying the gain of transducer output amplifier 53, as by a temperature responsive sensistor 54. Thus, the signal appearing at z in FIGURE 4 is a suppressed carrier signal with the modulation amplitude proportional to the air speed V. The carrier frequency is that of the transducer excitation voltage. The modulation frequency is the rotational frequency of the motor driven pitot tubes. To obtain the magnitude of the air speed the signal at z is applied to circuitry comprising an absolute value circuit 55, a low pass filter 56 and a modulator 57, the output from which may be applied to an indicator 58 and/or utilized for control purposes.

In order to provide directional indications, the relative air speed electrical signal at z in FIGURE 4 may be fed into a resolver unit 59 which may have two rotor windings and is driven by motor unit 60. The two signals leaving resolver 59, viz. X and Y, are functions of the components of velocity along respectively the fore and aft axis of the aircraft and an axis laterally thereof or perpendicular thereto. These two signals are fed through their respective indicating circuits comprising demodulators 61, 62, low pass filters 63, 64, modulators 65, 66, and indicators 67, 68. As is apparent the ratio of the lateral velocity to the fore and aft velocity gives an indication of the aircraft side slip angle. Since the electronic indicating circuitry forms no part of the present invention, no further discussion thereof is deemed necessary.

The manner in which the air speed sensing instrument of the present invention permits accurate readings of very low air speeds, down even to zero magnitude will now be discussed.

As pitot tubes 14 and 16 rotate in the direction of arrow 27 in FIGURE 1, a flow of air is generated that is substantially perpendicular to the plane of rotation of the tubes due to the slight pitch of air foils 17 and 18. This flow of air being substantially normal to the plane of measurement does not interfere with the signals sensed in said plane.

Without the air foils 17 and 18 of the present invention, the rotation of arms 13 and 15 would create a centrifugal flow in the rotation plane which flow would prevent the pitot tubes from sensing a signal that is indicative of low values of the relative velocity.

As stated earlier, the air foils of the present invention enable the measuring and indicating system to sense and record speeds down to zero, whereas, without said foils the lower limit of sensitivity has been about five knots. In the same manner, not fully understood, the flow of air substantially perpendicularly to the plane of rotation of arms 17 and 18 counteracts the effect on the pitot tubes 14 and 16 of the centrifugal whirl produced in the plane of these arms at low relative air speeds.

This increased sensitivity of the instrument of the present invention makes it particularly suitable for use on helicopters and other VTOL aircraft where zero air speeds are obtainable, and when so used is located in a position detached from the propulsion system thereof. In addition, the apparatus of the present invention may be used for measuring surface wind velocities, and as used herein, "air speed" is intended to include the speed of air as well as the speed of an object moving in air.

While a preferred embodiment of the present invention has been illustrated and described, other embodiments will occur to those skilled in the art. For example, vanes may be used instead of pitot tubes, since both types of devices are responsive to the velocity head of air flowing relative thereto. Therefore, it is intended that the invention be limited only by the scope of the appended claims.

What is claimed is:
1. In air speed measuring apparatus adapted for use on aircraft and when so used is located in a position detached from the propulsion system thereof, the combination comprising;
   (a) at least one rotatable arm,
   (b) sensing means on said arm responsive to the velocity of air flowing relative thereto,
   (c) constant speed motor means for rotating said arm at a substantially constant speed, and,
   (d) means fixed on and constrained to movement only about the rotational axis of said arm for developing a flow that is substantially perpendicular to the plane of rotation of said arm thereby to counteract the effect on said sensing means of the centrifugal whirl produced in the plane of said arm at low relative air speeds.

2. The combination as set forth in claim 1 wherein there are further provided;
   (e) transducer means responsive to the output of said sensing means for developing alternating signals at the frequency of rotation of said sensing means, and,
   (f) indicating means connected to said transducer means to provide magnitude and directional indications of the relative air speed.

3. The combination as set forth in claim 2 wherein there are further provided;
   (g) a second rotatable arm spaced substantially 180° from said first mentioned rotatable arm,
   (h) second sensing means on said second arm responsive to the velocity of air flowing relative thereto,
   (i) second means fixed on and constrained to movement only about the rotational axis of said second arm for developing a flow that is substantially perpendicular to the plane of rotation of said second arm,
   (j) said constant speed motor means is also operatively associated with said second arm for rotating the same at a substantially constant speed in unison with the first mentioned arm, and,
   (k) said transducer means is also responsive to the output of said second sensing means.

4. The combination as set forth in claim 3 wherein said sensing means are pitot tubes at the ends of said arms, and said means fixed on said arms are air foils.

5. In an air speed measuring apparatus adapted for use on aircraft and when so used is located in a position detached from the propulsion system thereof comprising;
   (a) a central hub mounted for rotation about an axis,
   (b) first and second passages in said hub,
   (c) first and second tubular arms communicating respectively with said first and second passages and fixedly attached to said hub,
   (d) velocity sensing means mounted at the ends of each of said arms,
   (e) first and second air foils fixedly attached respectively to said first and second arms, said air foils being pitched in opposite directions, and constrained to movement only about the rotational axis of said hub, and, (f) constant speed motor means for rotating said hub, arms and air foils at a substantially constant pseed.

References Cited

UNITED STATES PATENTS

| | | | |
|---|---|---|---|
| 2,846,878 | 8/1958 | Carbonara | 73—212 |
| 2,952,154 | 9/1960 | Traksel | 73—182 |
| 2,986,933 | 6/1961 | Summerlin et al. | 73—181 |
| 3,070,999 | 1/1963 | Garbell | 73—181 |
| 3,071,964 | 1/1963 | Hess | 73—181 |
| 3,176,774 | 4/1965 | Krinsky | 244—17.19 |
| 3,210,027 | 10/1965 | Culver et al. | 244—17.23 |

LOUIS R. PRINCE, *Primary Examiner.*

D. SCHONBERG, *Examiner.*

N. B. SIEGEL, *Assistant Examiner.*